(No Model.) 3 Sheets—Sheet 2.
G. A. HANNA & F. E. FAIRMAN.
WEIGHING AND REGISTERING MACHINE.
No. 572,986. Patented Dec. 15, 1896.
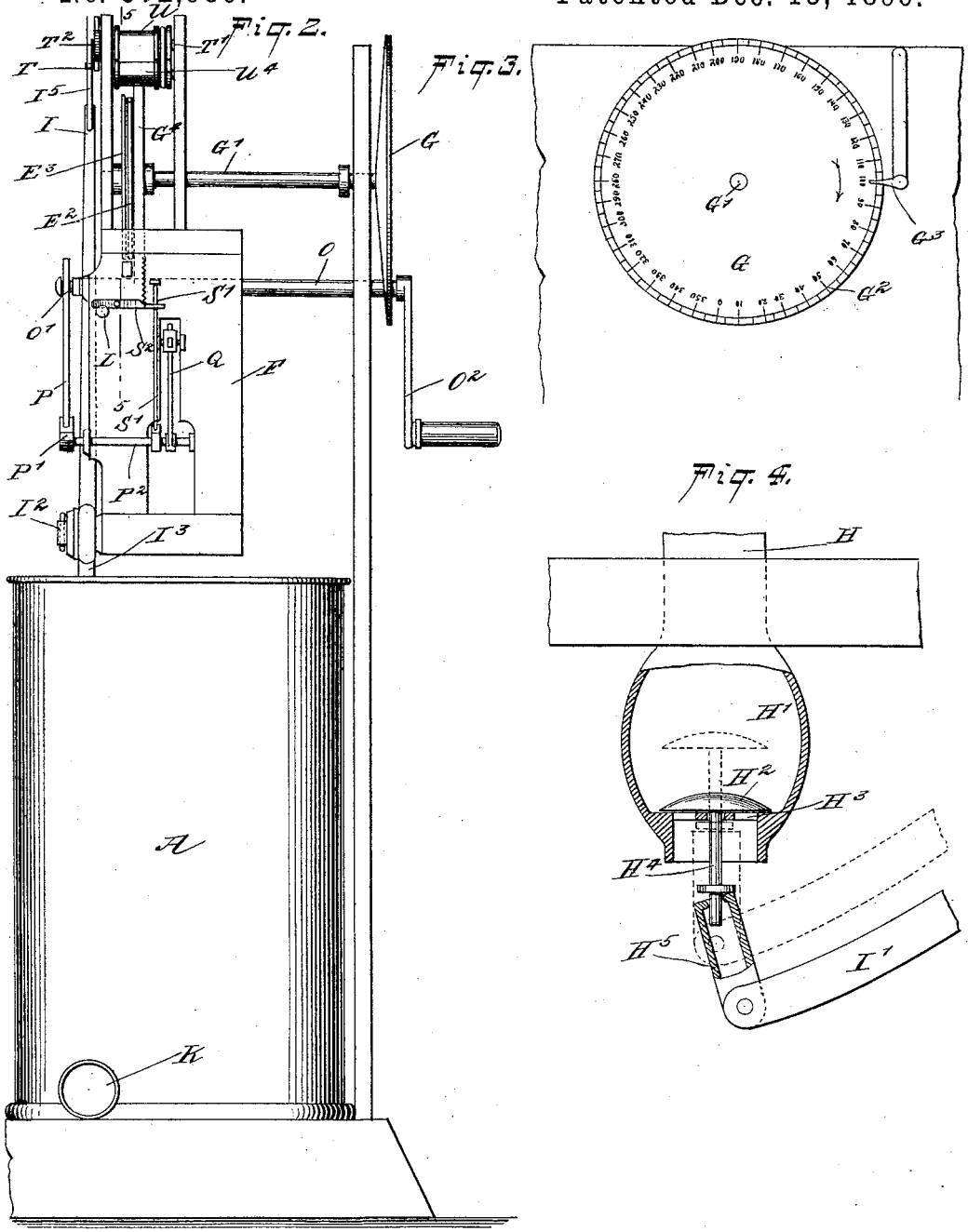

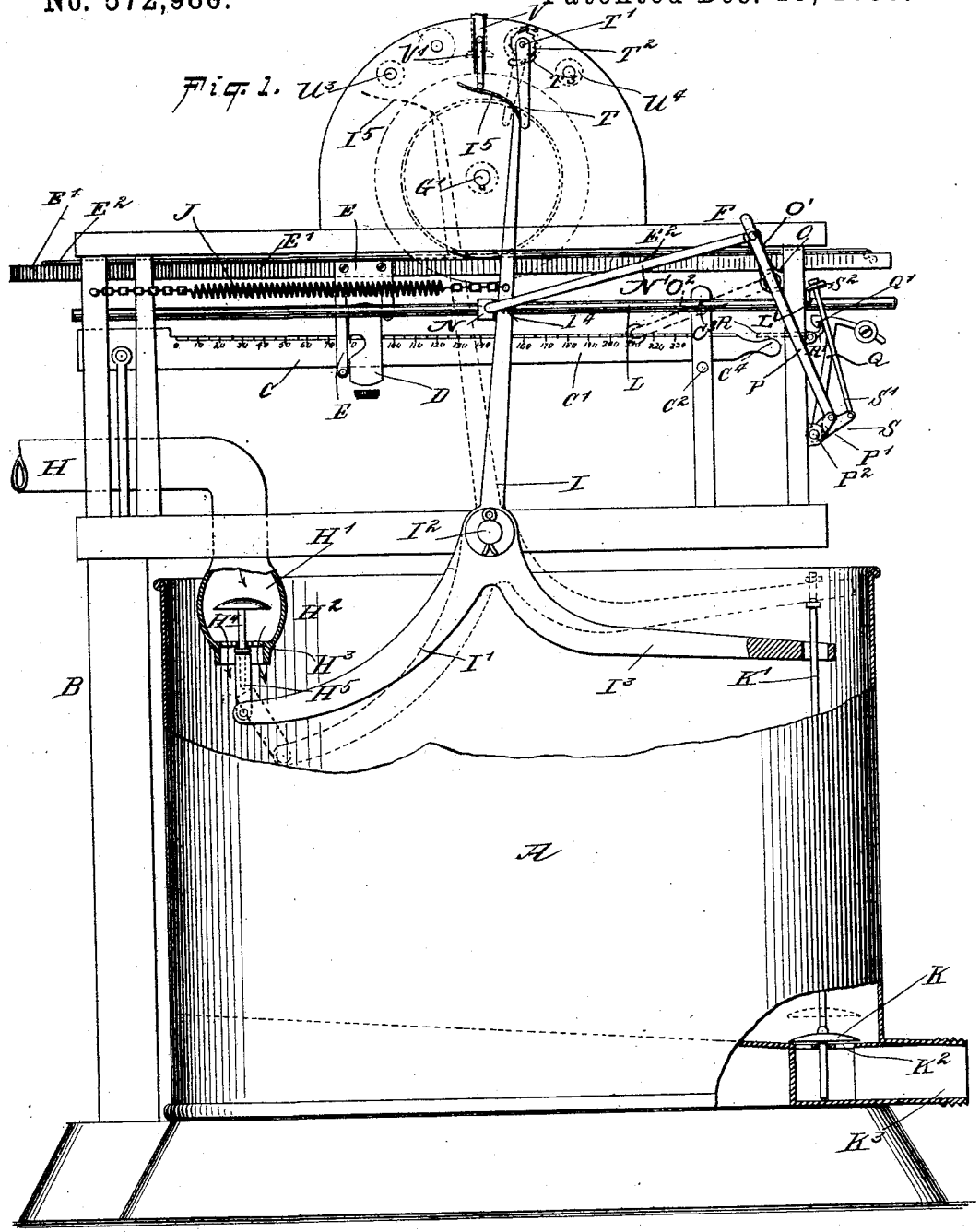

(No Model.) 3 Sheets—Sheet 3.

G. A. HANNA & F. E. FAIRMAN.
WEIGHING AND REGISTERING MACHINE.

No. 572,986. Patented Dec. 15, 1896.

WITNESSES:
William P. Gaebel.
Theo. G. Hoster.

INVENTORS
G. A. Hanna
F. E. Fairman
BY Munn & Co
ATTORNEYS.

THE NORRIS PETERS CO., PHOTO-LITHO., WASHINGTON, D. C.

UNITED STATES PATENT OFFICE.

GEORGE A. HANNA AND FRANK E. FAIRMAN, OF WHITTEMORE, IOWA; SAID FAIRMAN ASSIGNOR TO THEODORE A. SWANSON, OF SAME PLACE.

WEIGHING AND REGISTERING MACHINE.

SPECIFICATION forming part of Letters Patent No. 572,986, dated December 15, 1896.

Application filed November 2, 1895. Serial No. 567,689. (No model.)

*To all whom it may concern:*

Be it known that we, GEORGE A. HANNA and FRANK E. FAIRMAN, of Whittemore, in the county of Kossuth and State of Iowa, have invented a new and Improved Weighing and Registering Machine, of which the following is a full, clear, and exact description.

The object of the invention is to provide a new and improved weighing and registering machine which is simple and durable in construction, very effective in operation, and more especially designed for weighing and registering liquids, such, for instance, as skimmed milk at a creamery, the machine being arranged to automatically deliver to the milkman the amount of skimmed milk due him from the milk originally brought by him to the creamery.

The invention consists of certain parts and details and combinations of the same, as will be fully described hereinafter and then pointed out in the claims.

Reference is to be had to the accompanying drawings, forming a part of this specification, in which similar characters of reference indicate corresponding parts in all the figures.

Figure 5:
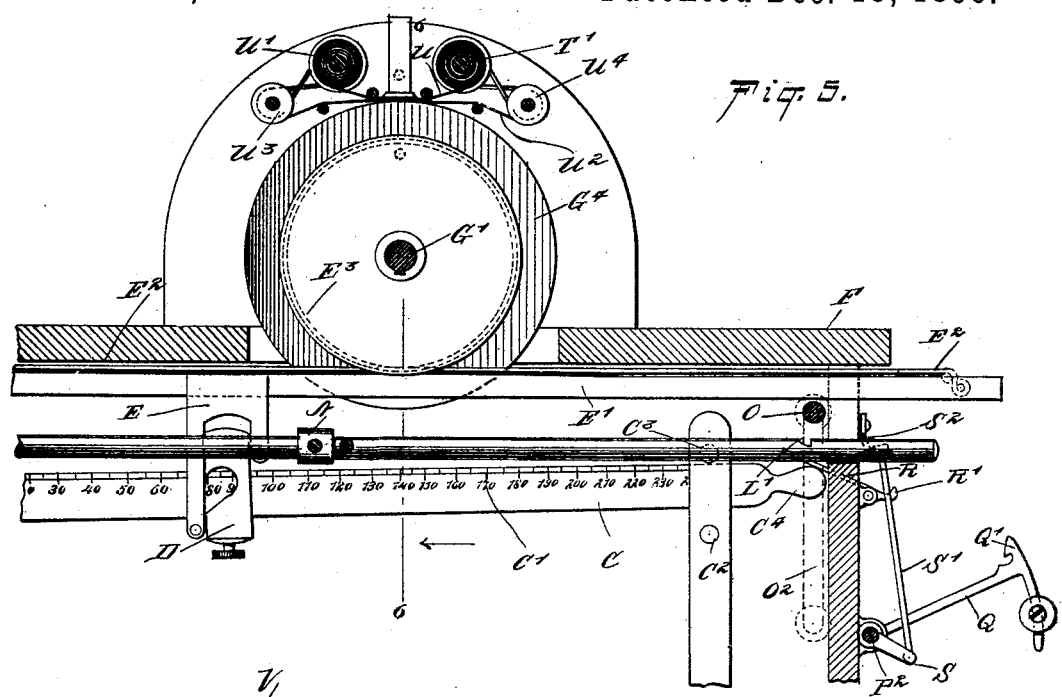
Figure 6:
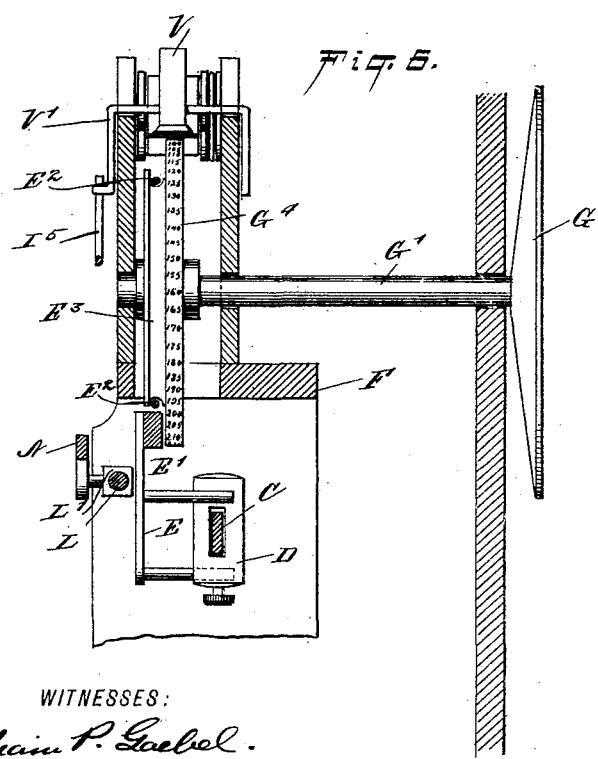

Figure 1 is a rear side elevation of the improvement with parts in section. Fig. 2 is an end elevation of the same. Fig. 3 is a face view of the dial indicating the amount of liquid delivered. Fig. 4 is an enlarged sectional side elevation of the inlet-valve. Fig. 5 is an enlarged rear sectional elevation of part of the improvement with the scale-beam and other parts in a different position, and Fig. 6 is a transverse section of the same on the line 6 6 of Fig. 5.

The improved machine is provided with a receptacle A, adapted to receive the amount of skimmed milk to be delivered to the milkman, the skimmed milk being the amount due him from the milk originally brought by him and after the cream has been extracted. Usually about eighty per cent. of the weight of full milk originally brought is due the milkman as skimmed milk.

The receptacle A is the platform of a scale B, provided with the usual beam C, having a graduation C', indicating pounds, carrying a poise D, set to indicate the amount of skimmed milk due the milkman and contained in the receptacle A. The scale-beam C has its movement limited by stop-pins $C^2$ and $C^3$, and the poise D of the said scale-beam is shifted by an arm E, loosely engaging opposite sides of the poise D, the arm being attached to a longitudinally-extending bar E', fitted to slide in a suitable framework F, set on the framework of the scale-beam.

On the bar E' are secured the ends of a rope $E^2$, wound at its middle on a pulley $E^3$, (see Figs. 5 and 6,) the pulley being secured on a transversely-extending shaft G', journaled in suitable bearings in a frame F and carrying at its outer end a dial G, formed with a graduation $G^2$, representing pounds, indicated by a pointer $G^3$, fixed to the framework.

Now it will be seen that when the dial G is turned, say, to one hundred pounds, as shown in Fig. 3, then the shaft G' is rotated, and likewise the pulley $E^3$, so that the rope $E^2$ causes a shifting of the bar E', which, by the arm E, moves the poise D on the scale-beam C to indicate on the graduation C' at eighty pounds; that is, the amount of skimmed milk due the milkman from the hundred pounds of full milk he originally brought, and indicated on the dial G by the pointer $G^3$. Thus the relation between the dial G and the beam C is such that the former indicates the weight of full milk brought by the milkman and the latter indicates the weight due the milkman in skimmed milk.

Into the receptacle A discharges an inlet-pipe H, connected with a suitable source of skimmed-milk supply, the said pipe being provided within the receptacle A with a valve-casing H', containing a valve $H^2$, adapted to be seated on a valve-seat $H^3$, formed in the casing H'. The stem $H^4$ of the valve $H^2$ is loosely connected at its lower end with a link $H^5$, held on the free end of an arm I', forming part of a lever I, fulcrumed at $I^2$ to the frame F. The lever I is pressed on by a spring J and is provided with a second arm $I^3$, extending in the top of the receptacle A and having a loose connection with the stem K' of the outlet-valve K, adapted to be seated on a valve-seat $K^2$, opening into a discharge-pipe $K^3$. The arrangement of the valves $H^2$ and $K$ relative to the arms $I'$ of the lever $I$ is such that when one of the valves is opened the other is closed, and vice versa.

The lever $I$ is connected at $I^4$ with a longitudinally-extending rod $L$, mounted to slide in suitable bearings in the frame $F$ and carrying a sleeve $N$, connected by a link $N'$ with the arm $O'$ of a shaft $O$, extending transversly and carrying at its forward end a handle or crank-arm $O^2$ under the control of the milkman or other operator. The arm $O'$ is connected by a link $P$ with an arm $P'$, held on a transversely-extending shaft $P^2$, journaled in suitable bearings on one side of the frame $F$, and on this shaft $P^2$ is secured an arm $Q$, provided at its free end with a hook $Q'$, adapted to engage the catch $R'$ of an arm $R$, normally resting on the top of the free end $C^4$ of the scale-beam $C$, to lock the latter in its lowermost position. On the shaft $P^2$ is also secured a second arm $S$, connected by a link $S'$ with a catch $S^2$, adapted to engage a notch $L'$ in the rod $L$, to lock the latter normally in position (see Fig. 1)—that is, when the valve $H^2$ is open and the valve $K$ is closed and the scale-beam $C$ is in its lowermost position.

The extreme upper end of the lever $I$ is provided with a curved arm $I^5$ and is adapted to engage an arm $T$, journaled loosely on a shaft $T'$, on which is adapted to wind a ribbon $u$, the said arm $T$ carrying a pawl $T^3$, engaging a ratchet-wheel $T^2$, secured on the said shaft $T'$. Now when the arm $T$ is moved to the right (see Fig. 1) by the lever $I$ swinging in the same direction, as hereinafter more fully described, then the pawl $T^3$, by engaging the ratchet-wheel $T^2$, turns the shaft $T'$ to wind up part of the ribbon $u$, which latter unwinds from a shaft $u'$. When the arm $I^5$ swings to the left, the arm $T$ swings in the same direction by its own gravity, and the pawl $T^3$ slides over the ratchet-teeth of the ratchet-wheel $T^2$ without turning the latter.

Under the ribbon $u$ is arranged a strip of paper $u^2$, passing over a printing-cylinder $G^4$, secured on the shaft $G'$ and having its periphery provided with printing-numerals corresponding to the numerals of the graduation $G^2$ on the dial $G$. An impression-bar $V$ is fitted to slide vertically, and is adapted to drop onto the ribbon $u$ to press the paper in contact with the numeral and to make an impression of this numeral on the paper $u^2$. The impression-bar $V$ is normally held in an uppermost position by an arm $V'$, projecting from the impression-bar and resting on the curved arm $I^5$ of the lever $I$. When the latter swings to the left, the curved arm $I^5$ moves from under the arm $V'$, so that the impression-bar can drop and make an impression on the paper, as above described. The paper $u^2$ unwinds from a roller $u^3$ to wind up on a roller $u^4$, both rollers being driven by pulleys and cross-belts from the shafts $T'$ and $u'$, respectively. (See Fig. 5.) The paper on the ribbon passes over suitable guide-rods to bring the same in proper position over the printing-cylinder $G^4$.

The operation is as follows: The milkman, entitled to skimmed milk, connects the outlet-pipe $K^3$ by a hose with the milk-cans in a wagon and then turns the dial $G$ around until the numeral indicating the amount of milk brought by him to the creamery stands at the pointer $G^3$. He next gives a turn to the arm $O^2$, so that the several parts are pushed into the position shown in Fig. 1—that is, causing the valve $K$ to seat itself on the valve-seat $K^2$ and causing the valve $H^2$ to open, so as to permit the skimmed milk to pass from the supply through the pipe $H$ into the receptacle $A$. As the milk accumulates in the receptacle $A$ it finally accumulates to the weight of eighty pounds, the amount to which the poise $D$ is set by the milkman turning the dial $G$, as previously explained. The scale-beam $C$ now swings upward, and in doing so causes the arm $R$ to release the hook $Q'$, so that the weighted arm $Q$ swings downward to cause the shaft $P^2$ to turn, and the latter in doing so swings the arm $S$ downward to cause the link $S'$ to release the catch $S^2$ from the notch $L'$, thereby unlocking the rod $L$. As soon as this takes place the spring $J$, by pulling on the lever $I$, connected with the said rod $L$, causes the lever to swing to the left, so that the arm $I'$ swings downward and causes the valve $H^2$ to seat itself on the seat $H^3$, thereby shutting off the supply of milk to the receptacle $A$, and at the same time the other arm $I^3$ lifts the stem $K'$ of the valve $K$ and raises the latter from its seat to permit the eighty pounds of milk contained in the receptacle $A$ to flow through the pipe $K^3$ into the milkman's cans. When the lever $I$ swings to the left by the action of its spring $J$, as above described, then an impression is made on the paper to register the amount of milk delivered to the milkman. The next milkman now connects the pipe $K^3$ of the empty receptacle $A$ with his cans, turns the dial $G$ so that the amount of milk he brought is indicated on the dial by the pointer $G^3$, and he then gives one turn to the crank-arm $O^2$ to cause a return movement of the arm $Q$, link $S$, and rod $L$, as well as the lever $I$, to the position shown in Fig. 1, and at the same time the movement of the lever $I$ causes a seating of the valve $K$ and an opening of the valve $H^2$ to permit the skimmed milk to flow through the pipe $H$ into the receptacle $A$ to the proportionate amount due the second milkman and indicated by the poise $D$ on the scale-beam $C$.

The crank-arm $O^2$ is preferably connected by a pawl-and-ratchet mechanism to the shaft $O$, so that the latter can only be turned in one direction by the operator. It is understood that the crank-arm $O^2$ cannot be turned around a second time until a weighing and registering has taken place.

Having thus fully described our invention, we claim as new and desire to secure by Letters Patent—

1. A machine of the class described, comprising a receptacle provided with an inlet-valve and an outlet-valve, a scale-beam carrying the said receptacle, a lever for controlling the said inlet-valve and outlet-valve, a tripping device actuated from the said scale-beam and connected with the said lever, and means, substantially as described, for resetting the said tripping device and actuating the said lever, to set the latter in position to close the outlet-valve and open the inlet-valve, as set forth.

2. In a machine of the character described, the combination of a receptacle having an inlet and an outlet, valves controlling the inlet and outlet of the receptacle, a lever connected to the valves at opposite sides of its pivotal point and arranged when moved to close one valve and open the other valve, said lever being arranged normally to hold the inlet-valve closed and the outlet-valve open, a weighing device connected to said receptacle and arranged to weigh the contents thereof, and means controlled by the weighing device when operated to hold the lever in one position, whereby the inlet-valve is maintained open and the outlet-valve is maintained closed, substantially as set forth.

3. In a machine of the character described, the combination of a receptacle having an inlet and an outlet, valves controlling the inlet and outlet of the receptacle, a lever connected to said valves and arranged to hold one valve open while the other valve is closed, said lever being arranged normally to hold the inlet-valve closed and the outlet-valve open, a scale-beam operatively connected with the receptacle to weigh the contents thereof, a locking device to hold the lever when the same is moved to shift the positions of the inlet and outlet valves, and means actuated from the movement of the scale-beam to release said lever and permit the same to assume its normal position, substantially as set forth.

4. In a machine of the character described, the combination of a receptacle having an inlet and an outlet, valves controlling the inlet and outlet of the receptacle, a movable bar connected to said valves and arranged to hold one valve open while the other valve is closed, said bar being normally arranged to hold the inlet-valve closed and the outlet-valve open, a scale-beam operatively connected to the receptacle to weigh the contents thereof, a locking device to hold the bar when the same is moved to shift the positions of the inlet and outlet valves, and means actuated from the movement of the scale-beam to release said bar and permit the same to assume its normal position, substantially as set forth.

5. In a machine of the character described, the combination of a receptacle having an outlet and an inlet, valves controlling the outlet and inlet of the receptacle, a lever connected to said valves and arranged to hold one valve open while the other valve is closed, said lever being arranged normally to hold the inlet-valve closed and the outlet-valve open, a bar connected to said lever and arranged to move therewith, a locking device to engage said bar and hold the same in position when the lever is moved to shift the positions of the valves, a scale-beam operatively connected to the receptacle and arranged to weigh the contents thereof, and means actuated from the movement of the scale-beam for releasing said bar and permitting the lever to move said valves to their normal positions, substantially as set forth.

6. In a machine of the character described, the combination of a receptacle having an inlet and an outlet, valves controlling the inlet and outlet of the receptacle, a movable bar connected to said valves and arranged to hold one valve open while the other valve is held closed, said bar being normally arranged to hold the inlet-valve closed and the outlet-valve open, a shaft mounted to turn and having one arm loosely connected to the said movable bar and arranged to move the same in one direction, whereby the normal position of said valve is reversed, a locking device arranged to engage said bar and hold the same when moved, a scale-beam operatively connected to the receptacle and arranged to weigh the contents thereof, and means actuated by the movement of said scale-beam to release said bar and permit the valves to assume their normal positions, substantially as set forth.

7. In a device of the character described, the combination of a receptacle having an inlet and an outlet, valves controlling the inlet and outlet of the receptacle, a slide-bar connected to the valves and arranged to hold one valve open while the other valve is held closed, said bar being normally arranged to hold the inlet-valve closed and the outlet-valve open, a shaft mounted to turn, a link connecting said shaft with the slide-bar, whereby when the shaft is turned said slide-bar is moved to shift the valves from their normal positions, a catch arranged to engage said slide-bar and hold the same when moved, a scale-beam operatively connected to the receptacle and arranged to weigh the contents thereof, a tripping device actuated by the movement of the scale-beam, said tripping device being connected to the catch and arranged when the scale-beam moves, to release said slide-bar and permit the valves to assume their normal positions, and a connection between said shaft and the tripping mechanism, substantially as set forth.

8. In a machine of the character described, the combination of a receptacle having valves, a lever controlling the valves of the receptacle, a scale-beam connected to the receptacle and arranged to weigh the contents thereof, a poise on the scale-beam, a movable part having graduations to indicate pounds, means for moving the poise on the scale-beam when said movable part is operated, a type-wheel actuated by the movement of said movable part, and means actuated by the said lever for feeding a strip of paper past said type-wheel, substantially as set forth.

9. In a machine of the character described, the combination of a receptacle having valves, a lever controlling the valves of the receptacle, a scale-beam connected to the receptacle and arranged to weigh the contents thereof, a poise on the scale-beam, a movable part graduated to indicate pounds and connected to and adapted to move the poise on the scale-beam, a type-wheel controlled by said movable part, means for feeding a strip of paper past said type-wheel, and an impression-bar actuated by said lever and arranged to press the paper against the type-wheel, substantially as set forth.

GEORGE A. HANNA.
FRANK E. FAIRMAN.

Witnesses:
JOHN NEWMAN,
C. B. HALDRIDGE.